(12) United States Patent
Kutzler et al.

(10) Patent No.: US 9,415,437 B2
(45) Date of Patent: Aug. 16, 2016

(54) SHEAR BEVELING WITH SERRATIONS

(71) Applicant: Fisher-Barton Specialty Products, Inc., Watertown, WI (US)

(72) Inventors: Gary John Kutzler, Watertown, WI (US); Dale Albert Fischer, Watertown, WI (US)

(73) Assignee: FISHER-BARTON SPECIALTY PRODUCTS, INC., Watertown, WI (US)

( * ) Notice: Subject to any disclaimer, the term of this patent is extended or adjusted under 35 U.S.C. 154(b) by 217 days.

(21) Appl. No.: 14/307,611

(22) Filed: Jun. 18, 2014

(65) Prior Publication Data
US 2015/0367393 A1 Dec. 24, 2015

(51) Int. Cl.
*B21J 5/02* (2006.01)
*B21K 11/02* (2006.01)
*B21J 5/00* (2006.01)
(Continued)

(52) U.S. Cl.
CPC . *B21J 5/02* (2013.01); *B21D 19/00* (2013.01); *B21D 53/647* (2013.01); *B21J 5/002* (2013.01); *B21K 11/02* (2013.01); *B21D 28/02* (2013.01); *B23D 23/02* (2013.01); *B23P 15/40* (2013.01); *B26D 2001/006* (2013.01); *Y10T 83/0524* (2015.04); *Y10T 83/9447* (2015.04)

(58) Field of Classification Search
CPC ...... B21D 19/00; B21D 53/647; B21D 31/02; B21D 28/02; B21J 5/002; B21J 5/02; B21J 5/027; B21J 13/02; B21K 11/02; B23D 23/02; B23P 15/40; B26D 2001/006; Y10T 83/9447; Y10T 83/0524; Y10T 83/0259; Y10T 83/0438; Y10T 83/5669; Y10T 83/5696; Y10T 83/5733; Y10T 83/5742; Y10T 83/6484; Y10T 83/6486; Y10T 83/8773
USPC ............... 72/324–339, 362; 76/29–31, 101.1, 76/106.5, 119
See application file for complete search history.

(56) References Cited

U.S. PATENT DOCUMENTS 422,929 A * 3/1890 Emerson et al. ..... B23D 35/002
83/693
1,420,786 A 6/1922 Thatcher
(Continued)

FOREIGN PATENT DOCUMENTS

AT 399305 4/1995
DE 1452757 10/1969
(Continued)

OTHER PUBLICATIONS

Mifflin, "Splurge or Save on Cutlery Knives, What Influences Knife Prices," http://housewares.about.com/od/cutleryknives/a/SplurgeSaveCutleryKnives.htm, 2 pages.
(Continued)

*Primary Examiner* — Phong Nguyen
(74) *Attorney, Agent, or Firm* — Michael Best & Friedrich LLP

(57) ABSTRACT

A method of manufacturing a part having a beveled edge with a serration formed in the beveled edge. The method includes positioning a part between a first die piece and a second die piece; and moving the first die piece relative to the second die piece. The movement results in both shearing a portion of the part to create the beveled edge, and serrating the beveled edge to create the serration.

11 Claims, 4 Drawing Sheets

(51) Int. Cl.
B21D 19/00 (2006.01)
B21D 53/64 (2006.01)
B23D 23/02 (2006.01)
B23P 15/40 (2006.01)
B21D 28/02 (2006.01)
B26D 1/00 (2006.01)

(56) References Cited

U.S. PATENT DOCUMENTS

| | | | |
|---|---|---|---|
| 2,467,585 A * | 4/1949 | Finkelstein | B26D 1/0006 83/679 |
| 2,589,050 A | 3/1952 | Carlson et al. | |
| 2,770,300 A | 11/1956 | Hill et al. | |
| 3,677,111 A | 7/1972 | Dragoo | |
| 3,741,046 A | 6/1973 | Chambon | |
| 3,803,894 A | 4/1974 | Bustin | |
| 4,555,965 A | 12/1985 | Deaton | |
| 4,569,263 A | 2/1986 | Kravets | |
| 4,706,524 A | 11/1987 | Fischer et al. | |
| 4,958,545 A | 9/1990 | Lenzotti | |
| 5,113,733 A | 5/1992 | Peterson et al. | |
| 5,251,514 A | 10/1993 | Rhodarmer et al. | |
| 6,973,855 B2 | 12/2005 | Yanosaka et al. | |
| 2006/0096424 A1 | 5/2006 | Klyzek | |

FOREIGN PATENT DOCUMENTS

| | | |
|---|---|---|
| EP | 0538720 | 4/1993 |
| FR | 2907362 | 4/2008 |
| JP | 201112116 | 6/2011 |
| WO | 9105626 | 5/1991 |
| WO | 2009080905 | 7/2009 |

OTHER PUBLICATIONS

European Extended Search Report for Application No. 15172075.2 dated Oct. 28, 2015 (5 pages).

* cited by examiner

SHEAR BEVELING WITH SERRATIONS

BACKGROUND

The present invention relates to the manufacturing of parts, and more particularly, parts with beveled and serrated portions.

Conventional manufacturing practice requires two separate and distinct steps to manufacture a part having a beveled edge with a serration formed in the beveled edge. More specifically, conventional practice requires a first beveling step in addition to a separate, second grinding, broaching or shaving step to create serrations. This increases the cost and time to manufacture the parts.

SUMMARY

In one embodiment, the invention provides a method of manufacturing a part having a beveled edge with a serration formed in the beveled edge. The method includes positioning a part between a first die piece and a second die piece; and moving the first die piece relative to the second die piece. The movement results in both shearing a portion of the part to create the beveled edge, and serrating the beveled edge to create the serration.

In another embodiment the invention provides a die set configured for creating, in a single operation, a part having a beveled edge with a serration formed in the beveled edge. The die set includes a first die piece having a first contact surface and a second die piece having a second contact surface. A projection is formed on the second contact surface. The first die piece and the second die piece are movable relative to each other with the first contact surface and the second contact surface operable to both shear and serrate a part during the relative movement.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
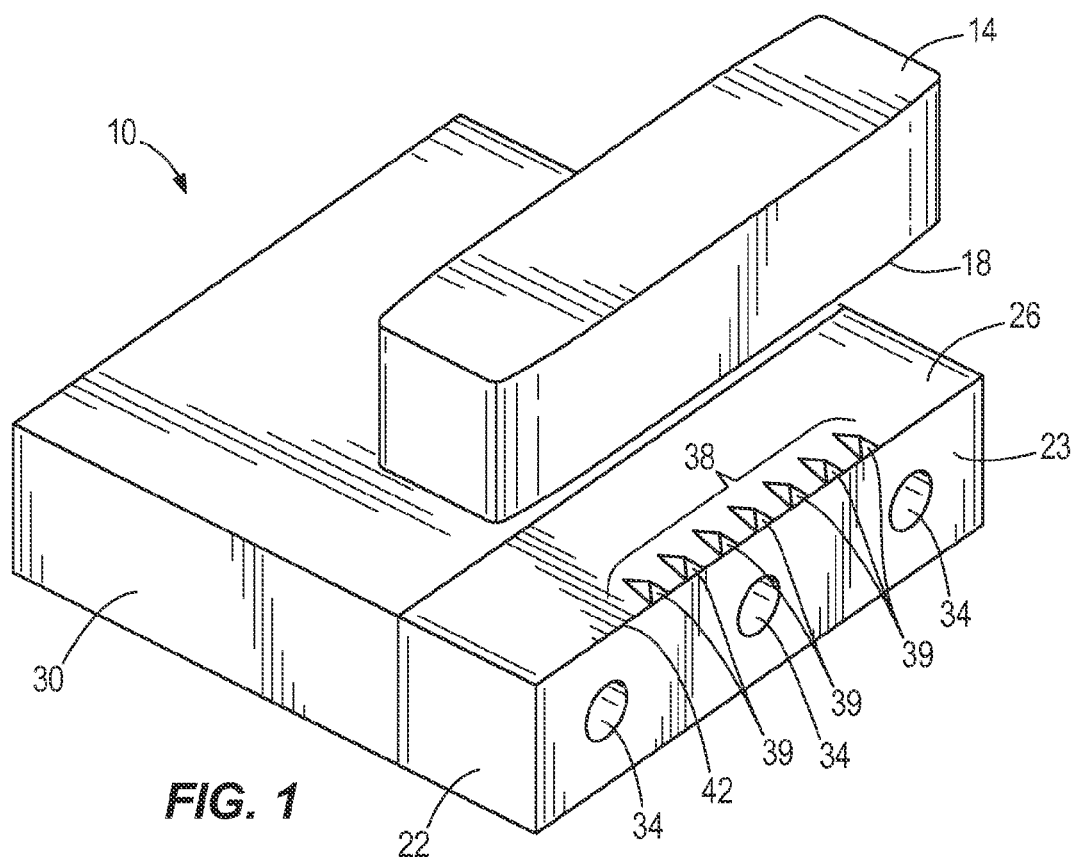
FIG. 1 is a perspective view of a die set according to an embodiment of the invention.

With reference to FIG. 1, a die set 10 is illustrated according to an embodiment of the present invention. The die set 10 can be part of a progressive-die forming operation with multiple stations, or can be a stand-alone die set. The die set 10 includes a first die piece 14 having a first contact surface 18, and a second die piece 22 having a second contact surface 26. In the illustrated embodiment, the first die piece 14 is positioned above the second die piece 22. It can be supported and driven in any suitable manner, and in the illustrated embodiment, it can be cam-driven. In alternative embodiments, the first die piece 14 and the second die piece 22 may be arranged relative to each other in any orientation. A tool holder 30 secures the second die piece 22 in position and at least partially supports an unformed part 200 to be manufactured (see FIG. 4a). Bores 34 (e.g., counter-sunk bores) formed in the second die piece 22 allow for fasteners (not shown) to secure the second die piece 22 to the tool holder 30.

Figure 2:
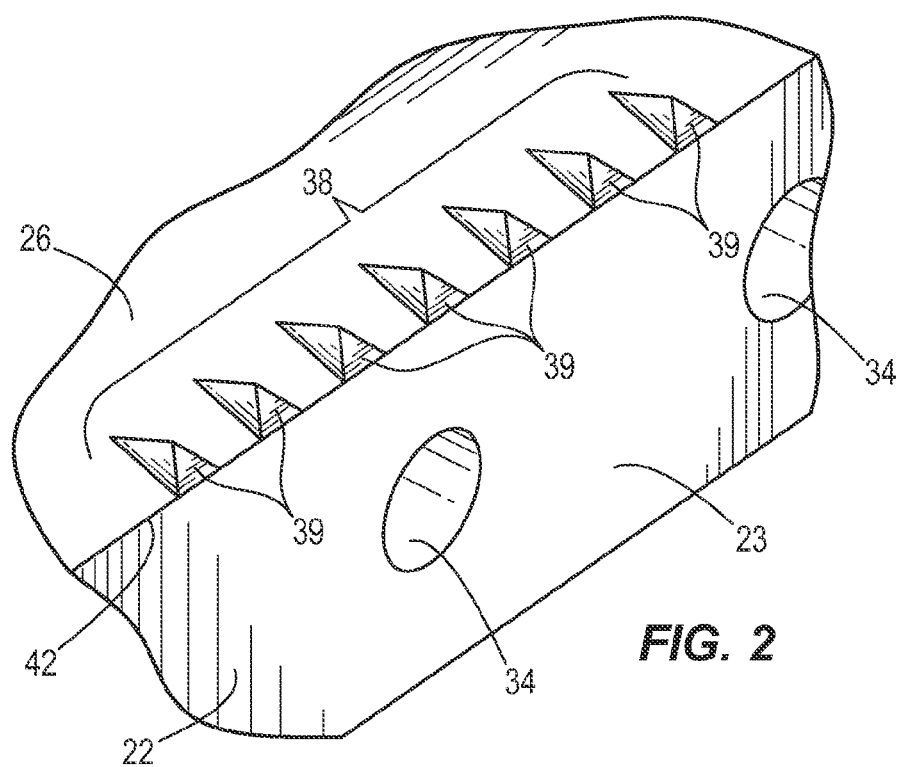
FIG. 2 is an enlarged partial perspective view of the die set of FIG. 1.

With reference to FIGS. 1 and 2, a plurality of projections 38 are formed on the second contact surface 26. More specifically, the projections 38 extend outwardly from the second contact surface 26 (i.e., toward the first contact surface 18). The first die piece 14 and the second die piece 22 are movable relative to each other. The first contact surface 18 and the second contact surface 26, in combination with the projections 38, are operable to both shear and serrate the unformed part 200 during the relative movement, as described in further detail below.

With reference to FIG. 2, the plurality of projections 38 are generally pyramid-shaped and are arranged equally spaced apart in a row along an edge 42 of the second contact surface 26 on the second die piece 22. In further alternatives, any number of projections may be used. In addition, the projections in alternative embodiments may include a variety of shapes (i.e., cuboidal, spherical, diamond, etc.) depending upon the desired shapes of the serrations. Furthermore, in alternative embodiments, projections may be positioned on a contact surface in any location (i.e., not along an edge) or in any pattern desired to achieve the desired serration location and pattern.

Figure 3:
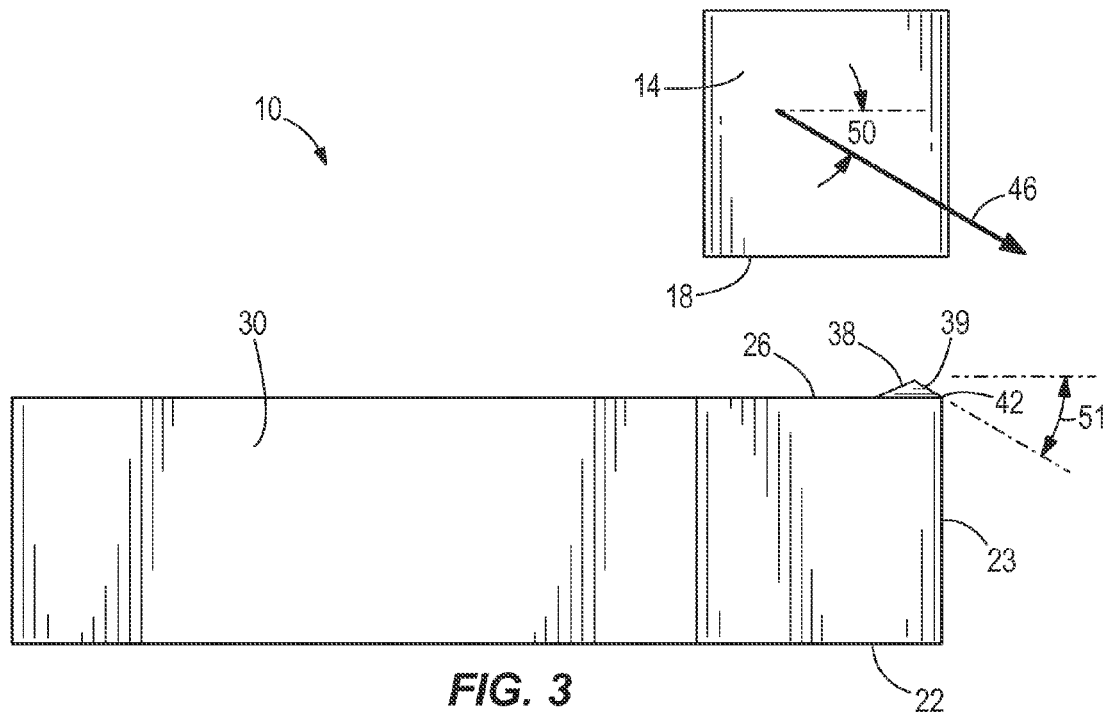
FIG. 3 is a side view of the die set of FIG. 1.

With reference to FIG. 3, the first die piece 14 moves in a direction 46 defining an oblique angle 50 relative to horizontal while the second die piece 22 is held stationary by the tool holder 30. The oblique angle 50 is approximately the same as an angle 51 of a sloping face 39 of the projections 38, and in some embodiments the angle 51 may be exactly the same as the oblique angle 50. An example of a manufactured, finished part 210 (i.e., a cutting blade) formed with the die set 10 is illustrated in FIG. 5. The manufactured part 210 includes a beveled and serrated edge 214 having a beveled edge 218 that includes a plurality of serrations 222 along the beveled edge 218. The beveled edge 218 includes a leading edge 219 and a trailing edge 220, and in the illustrated embodiment, the serrations 222 are formed in the leading edge 219 but do not extend all the way to the trailing edge 220. In other words, the serrations 220 do not extend across the entire beveled edge 218. The serrations 222 are deviations (i.e., discontinuities) in the beveled edge 218 where material has been removed. The direction 46 of movement defines a bevel angle 226 of the manufactured part beveled edge 218 (see FIG. 4c). In other words, the first die piece 14 and the second die piece 22 are moveable relative to each other at the oblique angle 50 such that the oblique angle 50 defines the bevel angle 226 of the beveled edge 218. In the illustrated embodiment, the oblique angle 50 and bevel angle 226 are substantially 30 degrees. However, in alternative embodiments the angles 50, 226 may be within a range of, for example, 10 degrees to 80 degrees.

Figure 4A:
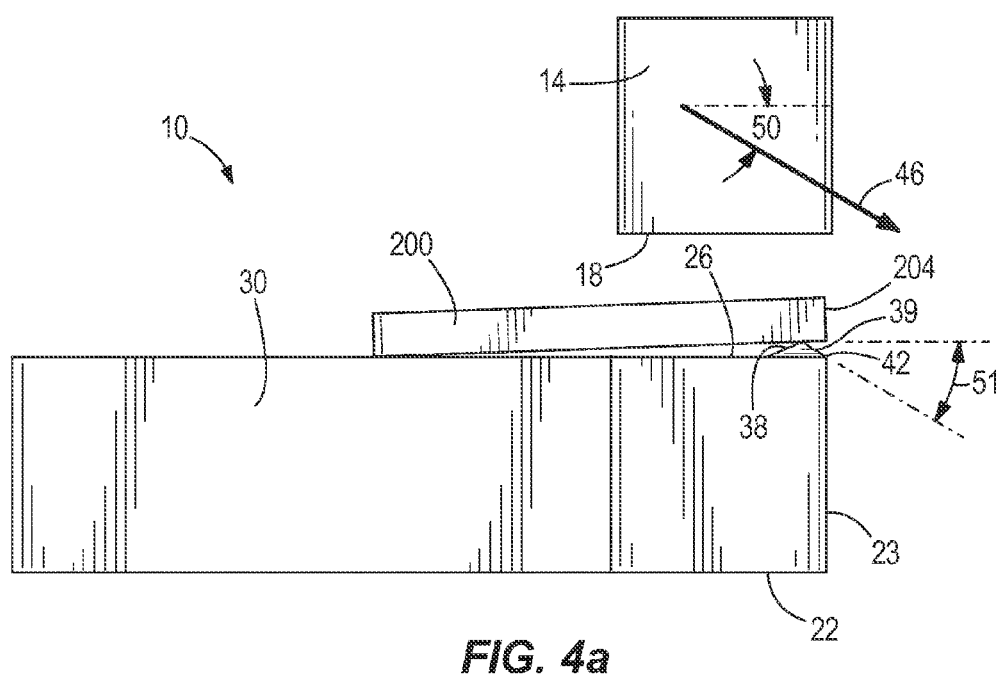
FIG. 4a is a side view of the die set of FIG. 1 with an unformed part to be manufactured positioned within the die set.
Figure 4B:
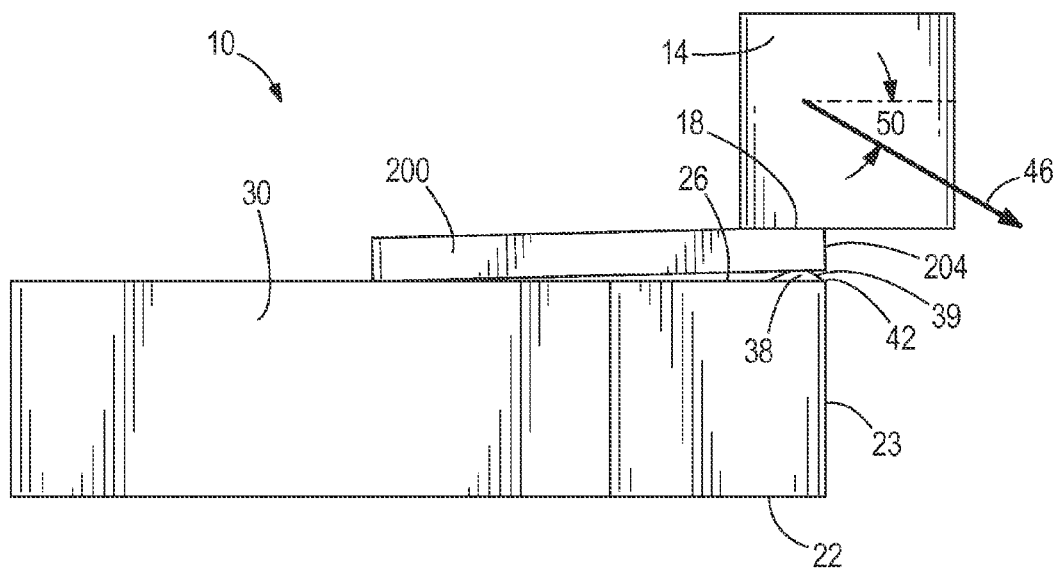
FIG. 4b is a side view of the die set and the part of FIG. 4a illustrating relative movement between a first die piece and a second die piece of the die set.
Figure 4C:
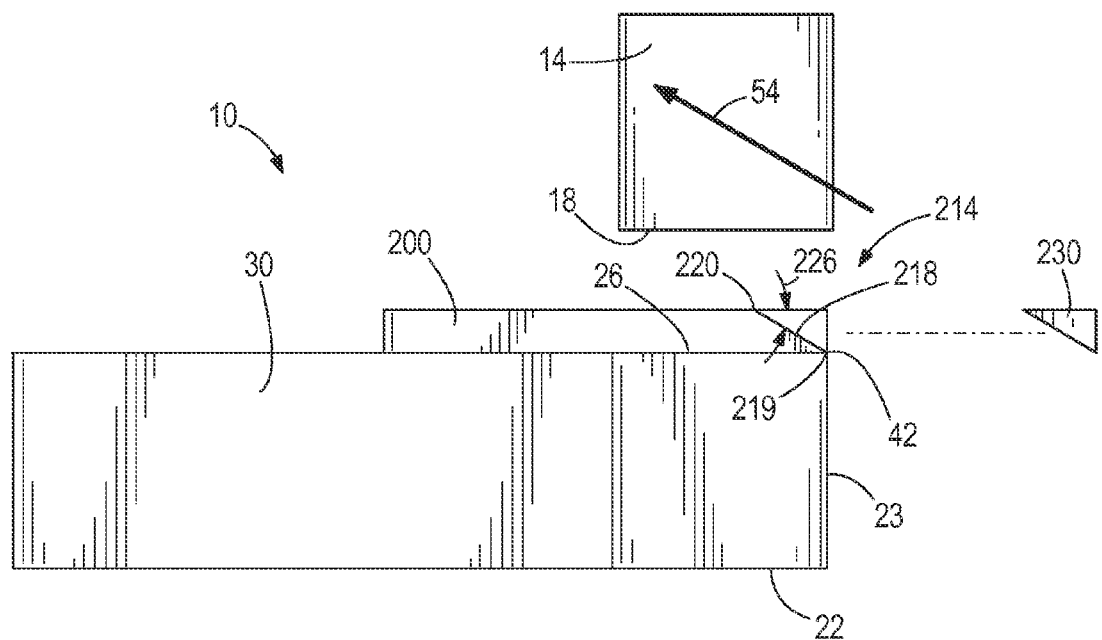
FIG. 4c is a side view of the die set and the part of FIG. 4a illustrating a slug removed to create a finished part with a beveled and serrated edge.
Figure 5:
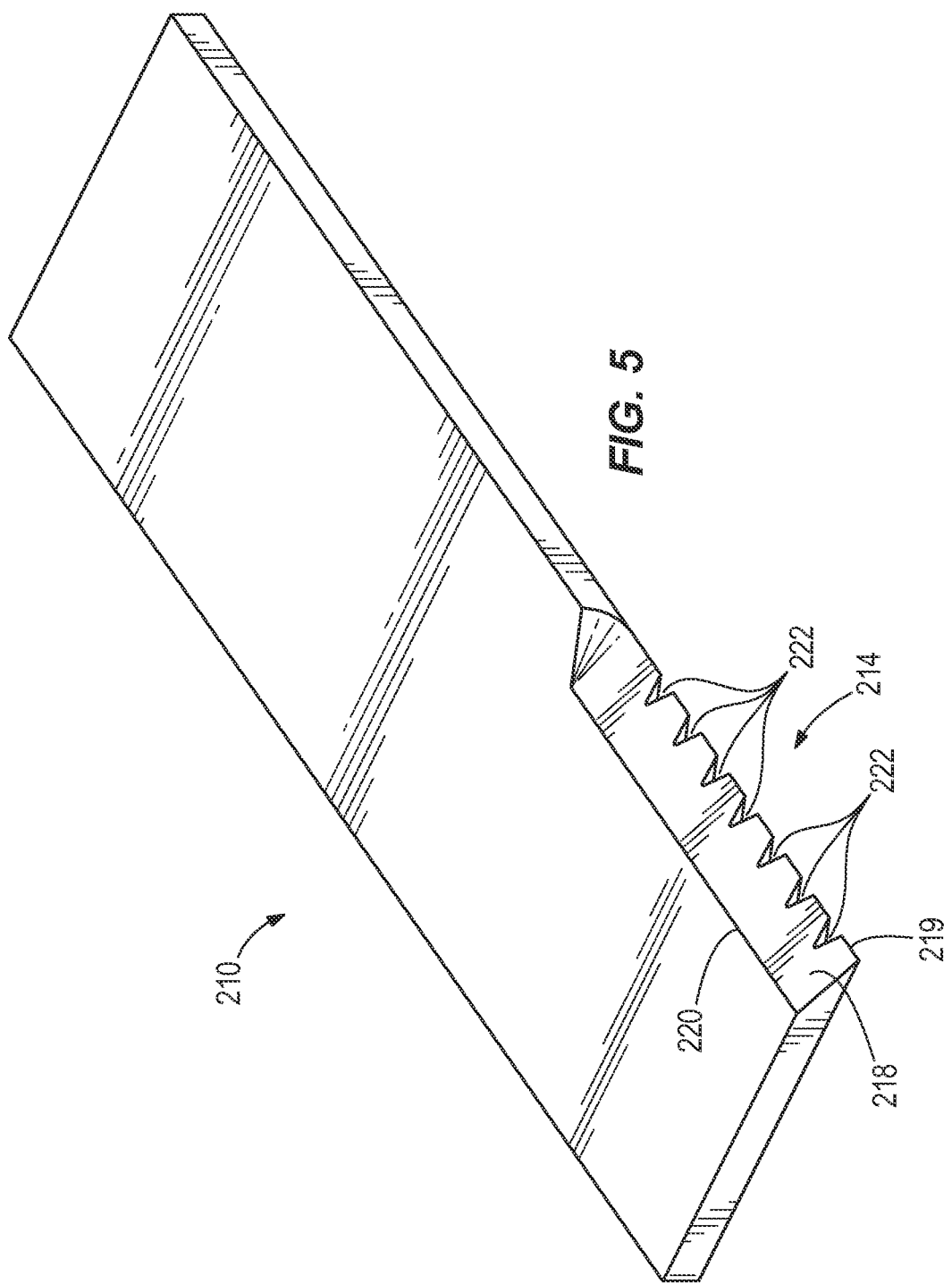
FIG. 5 is a perspective view of the finished part having the beveled and serrated edge of FIG. 4c manufactured with the die set of FIG. 1.

FIGS. 4a-4c illustrate the steps of a method of manufacturing the part 210 having the beveled edge 218 with serrations 222 formed in the beveled edge 218. First, the unformed part 200 is positioned between the first die piece 14 and the second die piece 22. An unfinished surface 204 of the unformed part 200 is positioned substantially in line with a front surface 23 of the second die 22 with a portion of the unformed part 200 overlapping or resting on the projections 38. When the unformed part 200 is positioned within the die set 10, the projections 38 prevent the unformed part 200 from resting completely flat along the second contact surface 26. Next, the first die piece 14 is moved relative to the second die piece 22, and the movement results in both shearing a portion of the unformed part 200 to create the beveled edge 218, and serrating the beveled edge 218 to create the serrations 222 simultaneously. Moving the first die piece 14 relative to the second die piece 22 includes holding the second die piece 22 stationary with the unformed part 200 at least partially supported on the second die piece 22, and moving the first die piece 14 relative to the unformed part 200 and the second die piece 22. In the illustrated embodiment, the second die piece 22 includes the projections 38 extending toward the supported unformed part 200 such that moving the first die piece 14 relative to the second die piece 22 causes the projections 38 to displace material in the unformed part 200 to form the serrations 222 in the beveled edge 218. In the illustrated embodiment, the plurality of serrations 222 are evenly spaced along the beveled edge 218 on the leading edge 219.

With reference to FIG. 4b, the die set 10 is illustrated just as the first die piece 14 first contacts the unformed part 200. Moving the first die piece 14 relative to the second die piece 22 creates a compression force between the unformed part 200 and the projections 38 such that the serrations 222 are formed by displacing material of the unformed part 200. In addition, moving the first die piece 14 relative to the second die piece 22 creates a shearing force on the unformed part such that the beveled edge 218 is formed by displacing a slug 230 (FIG. 4c) of the unformed part 200. Therefore, the shearing and the serrating occur substantially simultaneously as the first die piece 14 moves relative to the second die piece 22. With reference to FIG. 4c, the slug 230 is removed by the shearing force to create the finished part 210 having the beveled and serrated edge 214. The areas on the finished part 210 and the slug 230 that surround the projections 38 are work hardened due to the displacement of material during the manufacturing process. With reference to FIG. 4c, after removal of the slug 230, the first die piece 14 is moved relative to the second die piece 22 in a direction 54 substantially opposite the direction 46 to position the die set 10 to receive another unformed part 200 and begin the manufacturing process again.

With reference to FIGS. 4a-5, the method of manufacturing the part 210 does not include a grinding operation, or any other subsequent operation, to form the serrations 222 in the beveled and serrated edge 214. The beveled and serrated edge 214 is manufactured during a single motion of the die set 10 (e.g., relative movement between the first die piece 14 and the second die piece 22). It has been found that in using the method of the invention, the formation of the serrations 222, caused by the pressure created during the relative movement of the first and second die pieces 14, 22 along with the presence of the projections 38, results in the material surrounding the serrations 222 being constrained by the die pieces 14, 22, while the material directly adjacent the projections 38 is allowed to flow. It is believed that the flowing material surrounding by the constrained material helps to prevent both cracking and the formation of burrs, both at the serrations 222 and also along the entire beveled edge 218. It has been found that in using the inventive method and the inventive die set 10, a higher quality beveled edge 218 (e.g, sharper, fewer cracks, and fewer burrs) is obtained as compared to conventional shear beveling operations in which no serrations are formed. Furthermore, the added benefit of having serrations 222 is also achieved on this higher-quality beveled edge 218.

Various features and advantages of the invention are set forth in the following claims.

What is claimed is:

1. A method of manufacturing a part having a beveled edge with a serration formed in the beveled edge, the method comprising:
   positioning a part between a first die piece and a second die piece; and
   moving the first die piece relative to the second die piece, the movement resulting in both shearing a portion of the part to create the beveled edge; and serrating the beveled edge to create the serration;
   wherein moving the first die piece relative to the second die piece includes moving the first die piece at an oblique angle relative to the second die piece, the oblique angle defining a bevel angle of the beveled edge; and
   wherein the second die piece includes a plurality of projections configured to form the serration in the beveled edge, and wherein moving the first die piece relative to the second die piece creates a compression force between the part and the plurality of projections such that the serration is formed by displacing material of the part.

2. The method of claim 1, wherein serrating the beveled edge creates a plurality of serrations evenly spaced along the beveled edge.

3. The method of claim 1, wherein the beveled edge includes a leading edge and a trailing edge and wherein serrating the beveled edge creates a plurality of serrations in a leading edge that do not extend to the trailing edge.

4. The method of claim 1, wherein the plurality of projections are generally pyramid shaped.

5. The method of claim 1, wherein each of the plurality of projections includes a surface sloped at an oblique angle, the oblique angle defining the bevel angle of the beveled edge.

6. The method of claim 1, wherein the plurality of projections are formed adjacent an edge of the second die piece.

7. The method of claim 1, wherein no grinding operation is used to form the beveled and serrated edge.

8. The method of claim 1, wherein moving the first die piece relative to the second die piece includes holding the second die piece stationary with the part at least partially supported on the second die piece, and moving the first die piece relative to the part and the second die piece.

9. The method of claim 8, wherein the second die piece includes the plurality of projections extending toward the supported part such that moving the first die piece relative to the second die piece causes the plurality of projections to displace material in the part to form the serration.

10. The method of claim 8, wherein the method further comprises securing the second die piece to a tool holder.

11. The method of claim 1, wherein the shearing and serrating occurs substantially simultaneously as the first die piece moves relative to the second die piece.

\* \* \* \* \*